Patented Sept. 22, 1953

2,653,162

UNITED STATES PATENT OFFICE 2,653,162

SYNTHESIS OF ALKYLENE CYANOHYDRINS

Leo S. Luskin, Philadelphia, Pa., assignor to Rohm & Haas Company, Philadelphia, Pa., a corporation of Delaware No Drawing. Application August 22, 1951, Serial No. 243,162

3 Claims. (Cl. 260—465.6)

This invention deals with the preparation of alkylene cyanohydrins by reacting a water-soluble alkylene oxide with hydrogen cyanide in the presence of an alkali metal salt of a carboxylic cation-exchange resin as catalyst.

It is known that the reaction between alkylene oxides and hydrogen cyanide is catalyzed by alkali metal or alkaline earth cyanides or hydroxides and by amines. The prior art methods all require steps for separation or removal of catalyst from the reaction mixture. Removal of relatively large quantities of alkaline earth metal hydroxides from the reaction mixture is reported as a slow, cumbersome step with losses in the filter cake unless extra efforts are made to wash product therefrom. Special methods are required to remove and recover amines. In any case, neutralization of remaining dissolved portions of catalyst must be effected. It would be desirable to overcome or avoid the difficulties which are met in the procedures previously proposed.

We have discovered that ethylene and propylene oxides react with hydrogen cyanide in the presence of alkali metal salts of carboxylic cation-exchange resins to form alkylene cyanohydrins in satisfactory yields. The process permits a low ratio of catalyst to reactants with ease of separation of catalyst and economies in neutralization without actual consumption of catalyst. When activity of the catalyst falls off, the catalyst is revivified by being treated with a dilute alkali metal hydroxide solution. The process is amenable to batch or continuous types of operation.

The alkylene oxides which are amenable to the process of this invention are ethylene and propylene oxides, which may be generically defined as oxiranes of two to three carbon atoms.

Hydrogen cyanide may be used in the form of liquid, gas, or solution. Aqueous solutions can be effectively used, water being a particularly useful medium in which reaction with alkylene oxide is effected. Hydrogen cyanide gas may be passed into an aqueous slurry of carboxylic exchanger and the reaction then carried on rapidly at temperatures considerably above the normal boiling point of liquid hydrogen cyanide. Yet liquid hydrogen cyanide may readily be used with temperatures up to 65° C. in the reaction mixture without appreciable losses and without use of pressure, by the use of which still higher temperatures are permitted.

When commercial hydrogen cyanide is prepared in liquid form, it is usually stabilized by addition of an inorganic acid. The stabilized product may be purified shortly before use by distillation, although such step is not essential. Stabilizer in undistilled product is taken up by the carboxylic resin catalyst, but is removed therefrom by treating the used catalyst with a dilute alkali metal hydroxide regenerant solution.

As catalyst there is used a carboxylic cation-exchange resin in the form of an alkali metal salt. Carboxylic exchange resins are available commercially. They are formed from unsaturated carboxylic acids such as acrylic, methacrylic, or maleic acids and a cross-linking polymerizable substance such as divinylbenzene or trivinylbenzene. Other resin-forming compounds, such as styrene, may also be used in forming the resinous structure. The carboxylic resin is converted to its salt form by being treated with a dilute solution of sodium hydroxide or potassium hydroxide. Excess alkali solution is rinsed from the resin. It is then ready for use.

The resin is ordinarily prepared in a granular form, such as 20 to 40 mesh or 10 to 50 mesh. The resin may likewise be used in the form of a coarse powder.

Reaction of alkylene oxide and hydrogen cyanide in the presence of a carboxylic exchange resin may be effected between about 25° and 95° C. with the most favorable reaction temperature in the range of 40° to 50° C. The reaction is usually performed in an aqueous medium. Water may be added to the reaction vessel or an aqueous solution of cyanohydrin may be used to give reaction mixtures with a high concentration of alkylene cyanohydrin. The reaction mixture is separated from the catalyst and acidified with a non-volatile acid. It can then be distilled.

If the reaction is performed batchwise, the resin from one reaction is used in the next until the rate falls off or conversion appreciably decreases. If the operation is conducted on a continuous basis, water, cyanohydrin solution, or other solvent, hydrogen cyanide, and alkylene oxide are fed to a column packed with carboxylic exchanger. The column is conveniently jacketed to control the temperature. The rate of flow through the column is controlled to give a favorable conversion. The effluent is desirably rendered acid, a pH between 3 and 6 being useful. The unreacted hydrogen cyanide and alkylene oxide are stripped off and returned to the column. The product is worked up, as by distillation.

Typical preparations are shown in the following examples in which parts are by weight.

Example 1

There were mixed 54 parts of hydrogen cyanide, 109 parts of propylene oxide, 180 parts of water, and 25 parts (0.2 equivalent) of a carboxylic resin in its sodium form, this resin being an insoluble copolymer of methacrylic acid and divinylbenzene in a particle size of 0.35–0.50 mm. The mixture was stirred and held at 45° C. for two hours. The reaction mixture was filtered. The filtrate was treated with phosphoric acid to bring the pH thereof below six. It was distilled, a fraction of 132 parts of propylene cyanohydrin being obtained at 116°–119° C./27 mm.

The resin with some reaction mixture retained therein was in condition for reuse.

Example 2

There were mixed 37 parts of a carboxylic resin in the form of its sodium salt and 272 parts of water. This mixture was stirred and heated to 45° C. in a reaction vessel equipped with a reflux condenser cooled with ice water. Thereto over a three hour period there was added a mixture of 136 parts of ethylene oxide and 81 parts of freshly distilled hydrogen cyanide. The temperature of this reaction mixture was kept between 45° and 50° C. by cooling. After addition of the reactants was complete, stirring was continued for two hours while the temperature of the reaction mixture was kept at 45° C. This mixture was filtered to remove the resin. The filtrate was treated with a trace of phosphoric acid to bring the pH to 5 and was distilled. A fraction of 186 parts was collected at 125° C./25–26 mm. It was ethylene cyanohydrin.

Example 3

The resin from Example 2 was mixed with 200 parts of water and with conditions about as described in Example 2 a mixture of 136 parts of ethylene oxide and 81 parts of distilled hydrogen cyanide was added. Reaction, separation and recovery were accomplished as above. There was obtained on distillation 196 parts of ethylene cyanohydrin.

This procedure was repeated four more times with the same resin. In the last preparation conversion began to decrease, the distillate of product amounting to 169 parts. The used resin was treated with a 5% sodium hydroxide solution and then rinsed with de-ionized water several times.

When this revivified resin was used in the same preparative procedure, there was obtained a conversion of 90%.

Example 4

There were mixed 34 parts of a cation-exchange resin having sodium carboxylate groups, 66 parts of water, and 200 parts of an aqueous 30% solution of ethylene cyanohydrin. This mixture was heated to about 50° C. and thereto were slowly added with stirring 81 parts of hydrogen cyanide and 132 parts of ethylene oxide, the temperature of the reaction mixture being maintained below 55° C. The reaction mixture was then stirred and heated with the temperature being raised to 65° C. The resin was separated by filtration and there was obtained a filtrate containing 84% of ethylene cyanohydrin.

By reacting an $\alpha,\beta$-alkylene oxide having two to three carbon atoms with hydrogen cyanide between 25° and 95° C. in the presence of a cation-exchange resin having alkali metal carboxylate groups as the functional groups thereof, there are formed corresponding alkylene cyanohydrins. The separation of resin and alkylene cyanohydrin is readily accomplished. The catalyst is not consumed, but may be repeatedly used over a long period of time with occasional revivification. The consumption of alkali is thus held to a minimum and acid is not consumed in neutralizing alkali.

Salts are then not formed and difficulties which would otherwise ensue are avoided. The reaction mixture does not form the intensely-colored by-products which are encountered in processes of the art in which strong bases or cyanides therefrom are used. The process provides good conversions and yields of ethylene and propylene cyanohydrins without the considerable proportions of by-products which result from use of strongly alkaline bases of their cyanides.

I claim:

1. A process for preparing alkylene cyanohydrins which comprises reacting an $\alpha,\beta$-alkylene oxide of two to three carbon atoms with hydrogen cyanide between 25° and 95° C. in the presence of a cation-exchange resin having alkali metal carboxylate groups as the functional groups thereof.

2. A process for preparing ethylene cyanohydrin which comprises reacting ethylene oxide with hydrogen cyanide between 25° and 95° C. in the presence of a carboxylic cation-exchange resin having sodium carboxylate groups as the functional groups thereof.

3. A process for preparing propylene cyanohydrin which comprises reacting propylene oxide with hydrogen cyanide between 25° and 95° C. in the presence of a carboxylic cation-exchange resin having sodium carboxylate groups as the functional groups thereof.

LEO S. LUSKIN.

References Cited in the file of this patent

UNITED STATES PATENTS

| Number | Name | Date |
|---|---|---|
| 2,390,519 | Davis et al. | Dec. 11, 1945 |
| 2,453,062 | Carpenter | Nov. 2, 1948 |
| 2,579,580 | Howk et al. | Dec. 25, 1951 |

OTHER REFERENCES

Nachod: "Ion Exchange" (Academic Press), pp. 271–272 (1949).

Nachod: "Ion Exchange" (Academic Press), pp. 265–267 (1949).